UNITED STATES PATENT OFFICE.

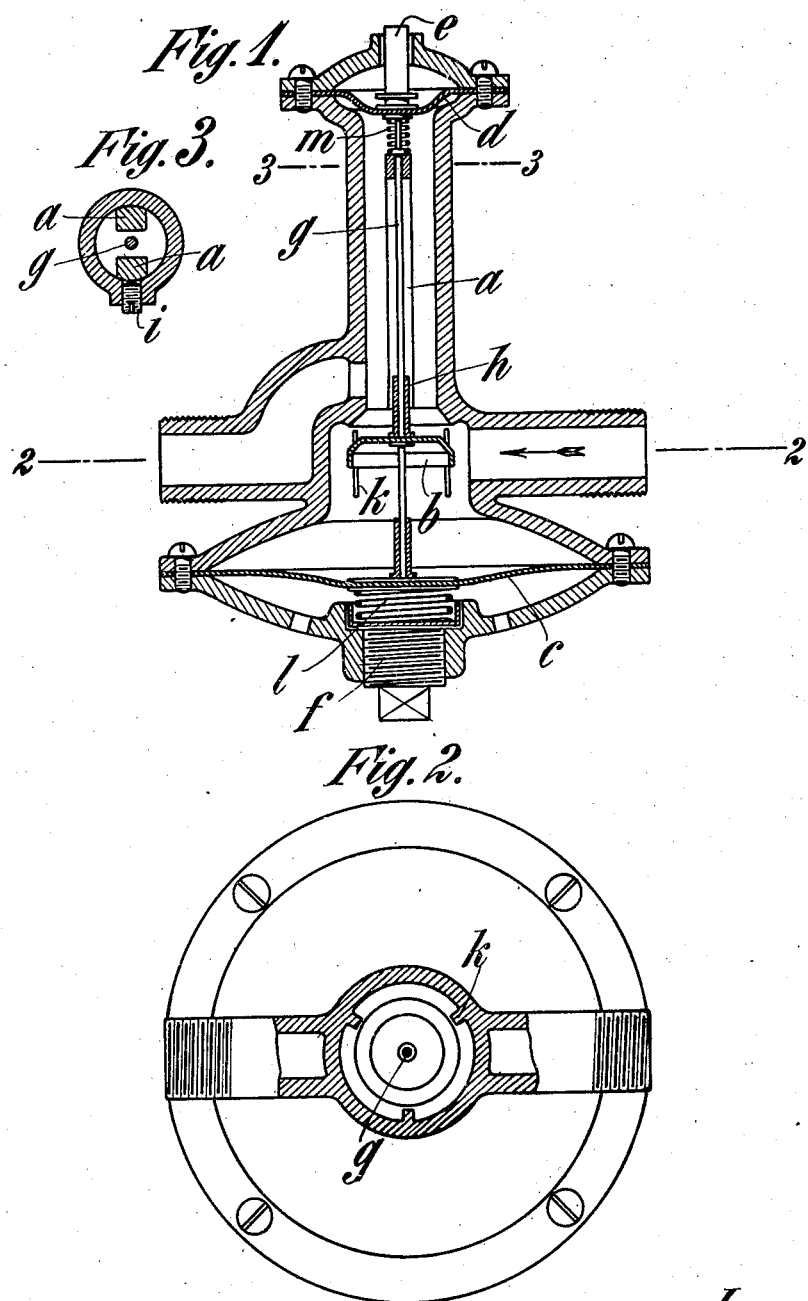

WILHELM SCHULZE, OF DETMOLD, GERMANY.

SAFETY-VALVE FOR GAS-CONDUITS.

No. 877,003.     Specification of Letters Patent.     Patented Jan. 21, 1908.

Application filed October 7, 1907. Serial No. 396,272.

*To all whom it may concern:*

Be it known that I, WILHELM SCHULZE, engineer, a subject of the German Emperor, residing at Detmold, German Empire, have invented a new and useful Safety-Valve for Gas-Conduits, of which the following is a specification.

Reference is to be had to the accompanying drawing, in which

Figure 1 is a longitudinal section of the safety valve, Fig. 2 is a section on line 2—2 of Fig. 1, and Fig. 3 a section on line 3—3 of Fig. 1.

It occurs with all gas-conduits that the supply is interrupted by one cause or another, and that the gas of a whole town is suddenly put out. When the gas is turned on again, it may easily happen that the same is not turned off or relighted at some place of consumption or another, so that it streams out without being burned, and may cause poisonings and explosions. This danger is prevented by the valve hereinafter described.

The valve-chamber is preferably made of brass. In the upper cylindrical part of the chamber is arranged a horse shoe-magnet $a$ in such a position over the seat of the iron valve $b$ that the valve is just then in its closing position when it is attracted by the magnet. The valve-plate is carried by a diaphragm $c$ similar to those used in dry gas-meters.

The diaphragm is held between two sheet metal plates and carries at the top a short tube which is sufficiently wide to allow, the pin carrying the valve-plate to move in it. The upper side of the diaphragm is under the pressure of the gas in the conduit. On the under side of the diaphragm there is a spring, 1 and the air can freely enter and pass out through a sufficient number of openings. In the casing the upper cylindrical part is likewise closed by diaphragm $d$. The pin $e$ on the other side of this diaphragm has sufficient free play for the air to enter and pass out of the part of the casing above the diaphragm $d$. The horse-shoe magnet is held in its position by a screw $i$. The valve-disk $b$ is guided by three ribs $k$.

The operation of the valve is as follows: When it is open, the gas passes freely through it. If any disorder occurs in the conduit, the gas pressure suddenly ceases and the flames become extinct. The pressure on the upper side of the diaphragm ceases, while on the other side the pressure of the spring 1 prevails and the diaphragm with the valve $b$ moves towards the seat, of said valve. The spring 1 can be accurately adjusted by means of the screw $f$. When the disturbance in the gas supply is removed, the gas presses back the diaphragm $c$ but the iron valve-disk $b$, held by the magnet $a$, remains on its seat and prevents the gas from passing through. In order to open the valve it is necessary to press down the pin $e$. The pressure is transmitted by the rod $g$ to the valve-disk, $b$ it draws it off from the magnet and brings it back to the diaphragm. The rod $g$ can freely move in a tube $h$ on the valve disk. If the pressure on the pressing pin ceases, the rod, together with the pressing pin, is raised again by the spring $m$. If the gas is on again the valve remains open, otherwise it closes again automatically.

Claim.

In a safety valve for gas conduits the combination with a casing of non-magnetic material and provided with conduits for the passage of the gas, of a valve seat arranged between said conduits, a valve of magnetic material fitting on to the seat, a diaphragm arranged below the valve seat and being loosely in contact with the stem of the valve, a magnet arranged above the valve, a diaphragm in the upper part of the casing, a pin contacting with the diaphragm and extending above the casing and a spring being in contact with a rigid part of the casing and the underside of the upper diaphragm.

In witness whereof I have signed this specification in the presence of two witnesses.

WILHELM SCHULZE.

Witnesses:
   ROBERT V. BÜLOW,
   T. A. WESSEL.